(12) United States Patent
Yang

(10) Patent No.: US 8,643,612 B2
(45) Date of Patent: Feb. 4, 2014

(54) TOUCHSCREEN OPERATION THRESHOLD METHODS AND APPARATUS

(75) Inventor: Xiao "Charles" Yang, Cupertino, CA (US)

(73) Assignee: mCube Inc., San Jose, CA (US)

( * ) Notice: Subject to any disclaimer, the term of this patent is extended or adjusted under 35 U.S.C. 154(b) by 481 days.

(21) Appl. No.: 12/787,200

(22) Filed: May 25, 2010

(65) Prior Publication Data

US 2011/0291934 A1    Dec. 1, 2011

(51) Int. Cl.
*G06F 3/041* (2006.01)
(52) U.S. Cl.
USPC ............................ 345/173; 257/414
(58) Field of Classification Search
USPC ................. 345/173–184; 178/18.01–19.07; 708/131, 142–146; 341/22–34; 340/7.1, 407.1–407.2; 257/414–427
See application file for complete search history.

(56) References Cited

U.S. PATENT DOCUMENTS

| | | | |
|---|---|---|---|
| 6,656,604 B2 | 12/2003 | Hasewaga | |
| 7,358,724 B2 | 4/2008 | Taylor et al. | |
| 7,514,760 B1 | 4/2009 | Quevy | |
| 7,599,277 B1 | 10/2009 | Kato et al. | |
| 7,612,443 B1 | 11/2009 | Bernstein et al. | |
| 7,671,478 B2 | 3/2010 | Wathanawasam et al. | |
| 8,140,358 B1 | 3/2012 | Ling et al. | |
| 2002/0072163 A1 | 6/2002 | Wong et al. | |
| 2003/0095115 A1* | 5/2003 | Brian et al. | 345/179 |
| 2003/0133489 A1 | 7/2003 | Hirota et al. | |
| 2004/0002808 A1 | 1/2004 | Hashimoto et al. | |
| 2004/0113246 A1 | 6/2004 | Boon | |
| 2004/0140962 A1* | 7/2004 | Wang et al. | 345/179 |
| 2004/0227201 A1* | 11/2004 | Borwick et al. | 257/414 |
| 2005/0199791 A1 | 9/2005 | Sengoku et al. | |
| 2006/0049826 A1 | 3/2006 | Daneman et al. | |
| 2007/0046239 A1 | 3/2007 | Hashizume | |
| 2007/0152976 A1* | 7/2007 | Townsend et al. | 345/173 |
| 2008/0211450 A1 | 9/2008 | Yamada et al. | |
| 2009/0007661 A1* | 1/2009 | Nasiri et al. | 73/504.03 |
| 2009/0015251 A1 | 1/2009 | Azumi et al. | |
| 2009/0049911 A1 | 2/2009 | Fukuda et al. | |
| 2009/0153500 A1* | 6/2009 | Cho et al. | 345/173 |
| 2009/0262074 A1 | 10/2009 | Nasiri et al. | |
| 2009/0267906 A1* | 10/2009 | Schroderus | 345/173 |
| 2009/0307557 A1 | 12/2009 | Rao et al. | |
| 2010/0045282 A1 | 2/2010 | Shibasaki et al. | |

(Continued)

OTHER PUBLICATIONS

Notice of Allowance for U.S. Appl. No. 12/717,070 mailed on Mar. 9, 2012, 9 pages.

*Primary Examiner* — Liliana Cerullo
(74) *Attorney, Agent, or Firm* — Kilpatrick Townsend & Stockton LLP

(57) ABSTRACT

A computer implemented method for performing a user-defined function in a computer system, performed by the computer system that is programmed to perform the method includes determining by a display a display position in response to a change and a rate change in state of a user-controlled user input device, determining by a physical sensor a magnitude of change in sensed physical in response to the rate of change in the state, determining whether the magnitude of change exceeds a threshold level, determining a function to perform in response to display position when magnitude of change in sensed physical properties exceeds the threshold level, initiating performance of the function in response to the function, and inhibiting performance of the function when the magnitude of change in sensed physical properties does not exceed the threshold level.

11 Claims, 16 Drawing Sheets

(56) References Cited

U.S. PATENT DOCUMENTS

| | | |
|---|---|---|
| 2010/0083756 A1 | 4/2010 | Merz et al. |
| 2010/0095769 A1 | 4/2010 | Matsumoto et al. |
| 2010/0109102 A1 | 5/2010 | Chen et al. |
| 2010/0171570 A1 | 7/2010 | Chandrahalim |
| 2010/0236327 A1 | 9/2010 | Mao |
| 2010/0248662 A1 | 9/2010 | Sheynblat et al. |
| 2010/0260388 A1 | 10/2010 | Garret et al. |
| 2011/0154905 A1 | 6/2011 | Hsu |
| 2011/0172918 A1 | 7/2011 | Tome |
| 2011/0183456 A1* | 7/2011 | Hsieh et al. .............. 438/53 |

* cited by examiner

WLP 1st layer
  Endpoint and stop on W or

TOUCHSCREEN OPERATION THRESHOLD METHODS AND APPARATUS

CROSS-REFERENCE TO RELATED APPLICATIONS

The present application relates to and incorporates by reference, for all purposes, the following pending patent applications: U.S. patent application Ser. No. 12/490,067, filed Jun. 23, 2009, and U.S. patent application Ser. No. 12/717,070, filed Mar. 3, 2010.

BACKGROUND OF THE INVENTION

Embodiments of the present invention relate to touch screen devices. More specifically, the present invention relates to touch screen devices capable of sensing the force of a touch and methods of use thereof.

The use of touch screen devices and touch user interfaces are now quite common place for consumers: from the signature machine in the checkout isle, to automatic teller machines at banks, to ticketing kiosks at airports, and the like. Touch screen capability is also now quite common in hand-held devices: from the Palm Pilot, to the Google Nexus One, to the Apple iPad, and the like.

Touch capability has typically been enabled for many touch screen devices through the incorporation and use of a resistive sensor network. These sensor networks can sense when a single finger of the user touches the display, or uses a stylus to touch the display.

Drawbacks to touch screen devices incorporating resistive-based sensors determined by the inventor include that if a user inadvertently touches two locations on the touch screen at the same time, the location reported by the touch screen if often incorrect. As such devices typically only support detecting one finger at a time, for example, the reported touch location may be between the two fingers. Another drawback includes that the user has to press down with some force on the touch screen before the touch screen can detect the user touch.

Newer capacitive-based touch screen displays are now more commonly used and address some of the short comings of a resistive-based sensor network. As an example, capacitive-based touch screens can sense the individual locations of fingers when the user touch the display with more than one finger. Accordingly, these devices are often termed "multi-touch" displays. As another example, capacitive-based touch screens do not require the user to press-down upon the touch screen before the finger is sensed.

Drawbacks to the use of capacitive-based touch screens determined by the inventor include that even if a user inadvertently brushes her finger across the touch screen, that accidental swipe may still be sensed as a user input. This is particularly frustrating, for example, when a user is trying to touch-type using a virtual keyboard to input text. In such cases, as the user hovers his fingers over the home row of the virtual keyboard, often his little finger, middle finger, or the like may accidentally touch the surface of the display. These touches are then incorrectly sensed as presses of the virtual keys causing typographical errors.

Although many touch screen devices include automatic spelling/prediction software to attempt to reduce the effect of typographic errors, in many instances, the predicted word is not the word the user wants. Accordingly, the user must constantly watch the touch screen display to monitor the automatic predictions and to select the correct word. These types of interruptions greatly interfere with the text-entry efficiency provided by the user's ability to touch-type.

Additional drawbacks determined by the inventor of resistive and capacitive based touch screen include that the sensed touches are typically binary in nature, i.e. either the finger is not touching or the finger is touching. These types of devices cannot sense the force with which a user touches the touch screen display. From a user point of view, these touch screen devices also do not provide a user with any sensation of pressing a button or key, i.e. they provide no tactile feedback.

One type of touch screen display used by Research In Motion (RIM) to provide the user with tactile feedback was used in the Blackberry Storm series of devices. In these products, one or more micro sensors were placed under the capacitive-based touch screen display. In operation, when the user wanted to make an on-screen selection, the user would press the touch screen display. The touch screen display would then deflect (by about a millimeter) and cause one of the micro sensors to physically click or switch. The physical click would thus provide the user with tactile confirmation of the button press.

Drawbacks to such approaches determined by the inventor, include that such devices were limited to the physical performance of the micro sensors. For example, a user could not type very quickly with such an approach because the user had to pause between key presses to wait until the micro sensors could fully reset before she could press the next key. Further, if the user placed two or more fingers on the touch screen at the same time she depressed the touch screen (activating the micro sensor(s)), it would be unclear which touch screen location or finger the user intended.

From the above, it is desired to have a multi-touch touch screen display without the drawbacks described above.

BRIEF SUMMARY OF THE INVENTION

Embodiments of the present invention relate to touch screen devices. More specifically, the present invention relates to touch screen devices capable of sensing the force of a touch and methods of use thereof.

Various embodiments of the present invention disclose a computer system such as a cell phone, internet access device, media player, or the like having a touch screen display and one or more physical sensors. In operation, when a user touches a location on the touch screen display, the function associated with the touched location is determined. The function may be running of an application program, selection of a function within an application program, and the like. In various embodiments, a type and/or magnitude of movement is determined by the one or more physical sensors also in response to the user touching the touch screen display. Based upon the type and/or magnitude of movement or combinations of movements, an input parameter or value may be determined for use by the selected function. Next, the function is initiated and given the input parameter or value.

Other embodiments of the present invention disclose a computer system such as a tablet computer, a smart phone, cell phone, or the like also having a touch screen display and one or more physical sensors. In operation, when a user touches a location on the touch screen display, the function associated with the touched location is again determined. The function may be running of an application program, selection of a function within an application program, and the like. In various embodiments, a type and/or magnitude of movement is determined by the one or more physical sensors also in response to the user touching the touch screen display. The type and/or magnitude of movement is then compared to one or more thresholds for type and/or magnitude of movement. In various embodiments, if the threshold is not exceeded, the function is uninhibited, and when the threshold is exceeded (e.g. enough physical impulse), the function is According to one aspect of the invention, a computer implemented method for performing a user-defined function in a computer system, performed by the computer system that is programmed to perform the method is described. One technique includes determining by a touchscreen display of the computer system, an indication of a display position associated with the touchscreen display in response to a user-initiated change in state of a user-controlled user input device relative to the computer system, wherein the user-initiated change in state is also associated with a rate of change in the state, and determining by a physical sensor of the computer system, a magnitude of change in sensed physical properties by the physical sensor in response to the rate of change in the state. A process includes determining by the computer system, whether the magnitude of change in sensed physical properties by the physical sensor exceeds a threshold level, and determining by the computer system, a user selection of a function to perform in response to the indication of the position associated with the touchscreen display when the magnitude of change in sensed physical properties by the physical sensor exceeds the threshold level. A method includes initiating by the computer system, performance of the function in response to the user selection of the function to perform, and inhibiting by the computer system, performance of the function when the magnitude change in sensed physical properties by the physical sensor does not exceed the threshold level.

According to another aspect of the invention, a computing device is disclosed. One device includes a touchscreen display configured to display images to a user and configured to sense a user touch on the touchscreen display with a user-controlled device, and a touchscreen display controller coupled to the touchscreen display, wherein the touchscreen display controller is configured to determine a selected location on the touchscreen display in response to the user touch. A system may include a physical sensor, wherein the physical sensor is configured to sense physical forces acting upon the physical sensor and configured to determine magnitudes of change in physical forces acting upon the physical sensor in response to the user touch. An apparatus may include a processor coupled to the touchscreen display controller and to the physical sensor, wherein the processor is programmed to determine a user-selected function to perform in response to the selected location on the touchscreen display, wherein the processor is programmed to initiate execution of the user-selected when the magnitudes of changes in sensed physical properties by the physical sensor exceeds the threshold level, and wherein the computer system is programmed to ignore the selected location when the magnitudes of changes in sensed physical properties by the physical sensor does not exceed the threshold level. In a specific embodiment, the physical sensor of the computer device comprises a monolithic MEMS and CMOS integrated circuit device. This monolithic device includes a first semiconductor substrate having a first surface region, one or more CMOS integrated circuit devices provided on a CMOS integrated circuit device region overlying the surface region. The CMOS integrated circuit device region includes a CMOS surface region. A dielectric region overlies the CMOS surface region and has a cavity region provided therein. The monolithic device also has a second semiconductor substrate having a second surface region overlying the dielectric region and enclosing the cavity region. The second semiconductor substrate has a spring region overlying the vicinity of the cavity region. A first piezo resistor device is provided within a first portion of the spring region and a second piezo resistor device is provided within a second portion of the spring region. A mass of material is coupled to a portion of the spring region of the second semiconductor substrate between the second piezo resistor device and the first piezo resistor device. The mass material overlies the cavity region and is coupled to the spring region to be movable from at least a first position to a second position and to be sensed respectively by either or both the first and second piezo resistor devices.

Various additional objects, features and advantages of the present invention can be more fully appreciated with reference to the detailed description and accompanying drawings that follow

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
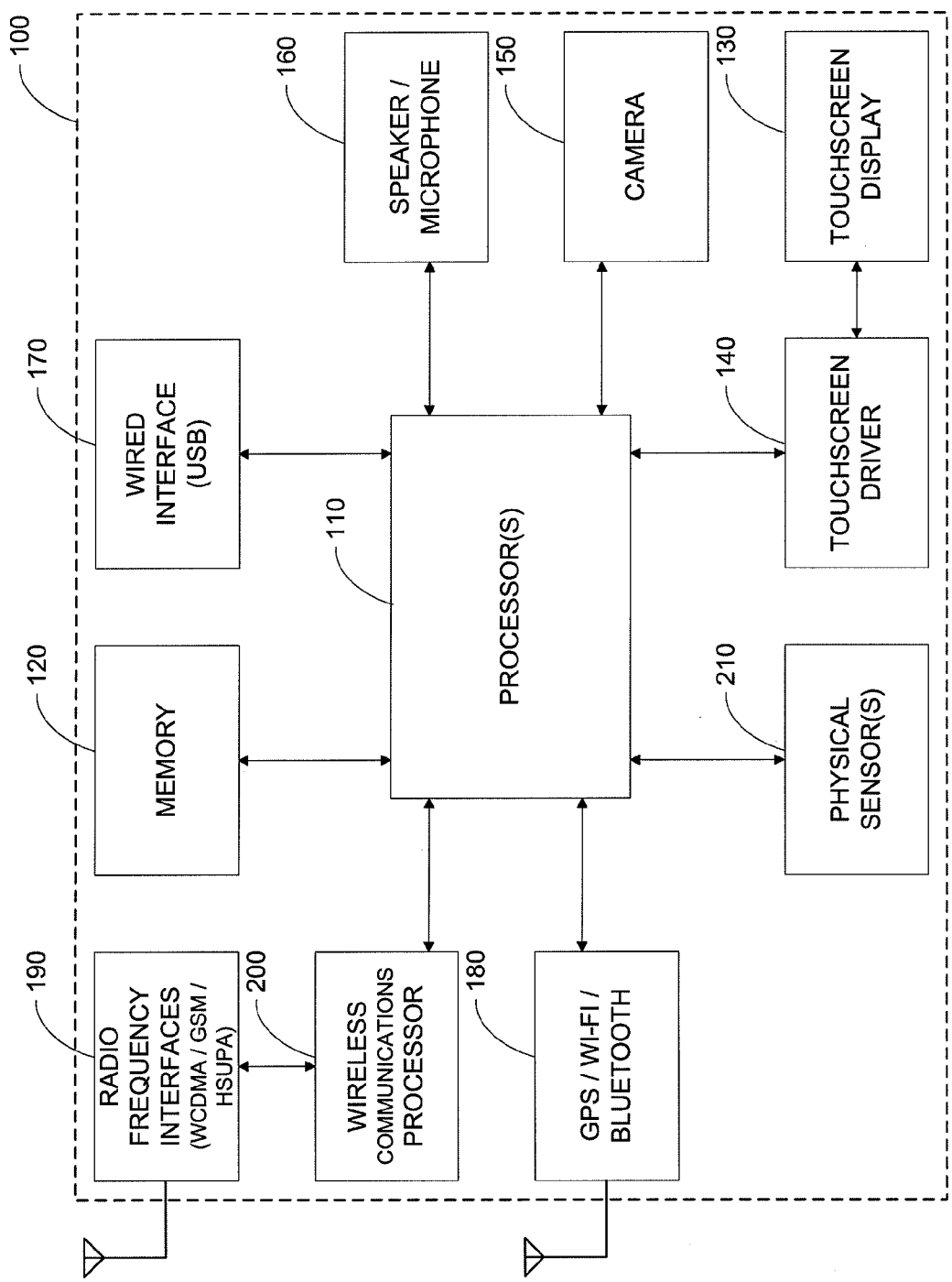
FIG. 1 illustrates a functional block diagram of various embodiments of the present invention.

FIG. 1 illustrates a functional block diagram of various embodiments of the present invention. In FIG. 1, a computing device 100 typically includes an applications processor 110, memory 120, a touch screen display 130 and driver 140, an image acquisition device 150, audio input/output devices 160, and the like. Additional communications from and to computing device are typically provided by via a wired interface 170, a GPS/Wi-Fi/Bluetooth interface 180, RF interfaces 190 and driver 200, and the like. Also included in various embodiments are physical sensors 210.

In various embodiments, computing device 100 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 100 may include one or more processors 110. Such processors 110 may also be termed application processors, and may include a processor core, a video/graphics core, and other cores. Processors 110 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 120 may include different types of memory (including memory controllers), such as flash memory (e.g. NOR, NAND), pseudo SRAM, DDR SDRAM, or the like. Memory 120 may be fixed within computing device 100 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 130 and driver 140 may be based upon a variety of later-developed or current touch screen technology including resistive displays, capacitive displays, optical sensor displays, electromagnetic resonance, or the like. Additionally, touch screen display 130 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 150 may include a sensor, driver, lens and the like. The sensor may be based upon any later-developed or convention sensor technology, such as CMOS, CCD, or the like.

In various embodiments of the present invention, image recognition software programs are provided to process the image data. For example, such software may provide functionality such as: facial recognition, head tracking, camera parameter control, or the like.

In various embodiments, audio input/output 160 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 110 to enable the user to operate computing device 100 by stating voice commands. Additionally, a speech engine may be provided in various embodiments to enable computing device 100 to provide audio status messages, audio response messages, or the like.

In various embodiments, wired interface 170 may be used to provide data transfers between computing device 100 and an external source, such as a computer, a remote server, a storage network, another computing device 100, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 180 may also be provided to provide wireless data transfers between computing device 100 and external sources, such as computers, storage networks, headphones, microphones, cameras, or the like. As illustrated in FIG. 1, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 1, GPS functionality is included as part of wireless interface 180 merely for sake of convenience, although in implementation, such functionality is currently performed by circuitry that is distinct from the Wi-Fi circuitry and distinct from the Bluetooth circuitry.

Additional wireless communications may be provided via RF interfaces 190 and drivers 200 in various embodiments. In various embodiments, RF interfaces 190 may support any future-developed or conventional radio frequency communications protocol, such as CDMA-based protocols (e.g. WCDMA), GSM-based protocols, HSUPA-based protocols, or the like. In the embodiments illustrated, driver 200 is illustrated as being distinct from applications processor 110. However, in some embodiments, these functionality are provided upon a single IC package, for example the Marvel PXA330 processor, and the like. It is contemplated that some embodiments of computing device 100 need not include the RF functionality provided by RF interface 190 and driver 200.

FIG. 1 also illustrates computing device 100 to include physical sensors 210. In various embodiments of the present invention, physical sensors 210 are multi-axis Micro-Electro-Mechanical Systems (MEMS) based devices being developed by M-cube, the assignee of the present patent application. Physical sensors 210 developed by M-cube currently includes very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. As described in the patent applications referenced above, various embodiments of physical sensors 210 are manufactured using a foundry-compatible process. As explained in such applications, because the process for manufacturing such physical sensors can be performed on a standard CMOS fabrication facility, it is expected that there will be a broader adoption of such components into computing device 100. In other embodiments of the present invention, conventional physical sensors 210 from Bosch, STMicroelectronics, Analog Devices, Kionix or the like.

In various embodiments, any number of future developed or current operating systems may be supported, such as iPhone OS (e.g. 4.0), WindowsMobile (e.g. 7), Google Android (e.g. 2.1), Symbian, or the like. In various embodiments of the present invention, the operating system may be a multi-threaded multi-tasking operating system. Accordingly, inputs and/or outputs from and to touch screen display 130 and driver 140 and inputs/or outputs to physical sensors 210 may be processed in parallel processing threads. In other embodiments, such events or outputs may be processed serially, or the like. Inputs and outputs from other functional blocks may also be processed in parallel or serially, in other embodiments of the present invention, such as image acquisition device 150 and physical sensors 210.

FIG. 1 is representative of one computing device 100 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 1. For example, in various embodiments, computing device 100 may lack image acquisition unit 150, or RF interface 190 and/or driver 200, or GPS capability, or the like. Additional functions may also be added to various embodiments of computing device 100, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

FIGS. 2A-D illustrate block diagrams of flow processes according to various embodiments of the present invention. For illustrative purposes only, reference to elements in FIG. 1 are provided in the discussion below merely for the sake of convenience.

In various embodiments of the present invention, physical sensors 210 are provided as part of a computing device 100, step 300. For example, physical sensors 210 provided by the assignee of the present patent application are provided to an assembly entity to form computing device 100. Computing device 100 is then assembled, step 310 and provided for the user, step 320. As described above, in various embodiments, computing device 100 may be a cell-phone, internet access device, a tablet computer, a personal media player/viewer, or the like running an appropriate operating system.

In ordinary use of such a device, computing device 100 (via the operating system) may display any number of graphical user interfaces including user-selectable regions on touch screen display 130, step 320. These user-selectable regions may include radio buttons, sliders, selection buttons, text entry regions and the like. Further, these soft buttons may be associated with application software functions, operating system functions, data management functions, telephony functions, audio processing functions, image processing functions, or the like.

Subsequently, the user determines a function they wish computing device 100 to perform after viewing the graphical user interface, step 340. In various embodiments, the user then touches or contacts a portion of touch screen display 130 corresponding to the user-selectable region, step 350.

Next, in various embodiments of the present invention, the following processes can be performed in parallel by different processing threads, serially by one or more processes, or independently in separate processing threads.

Figure 2A:
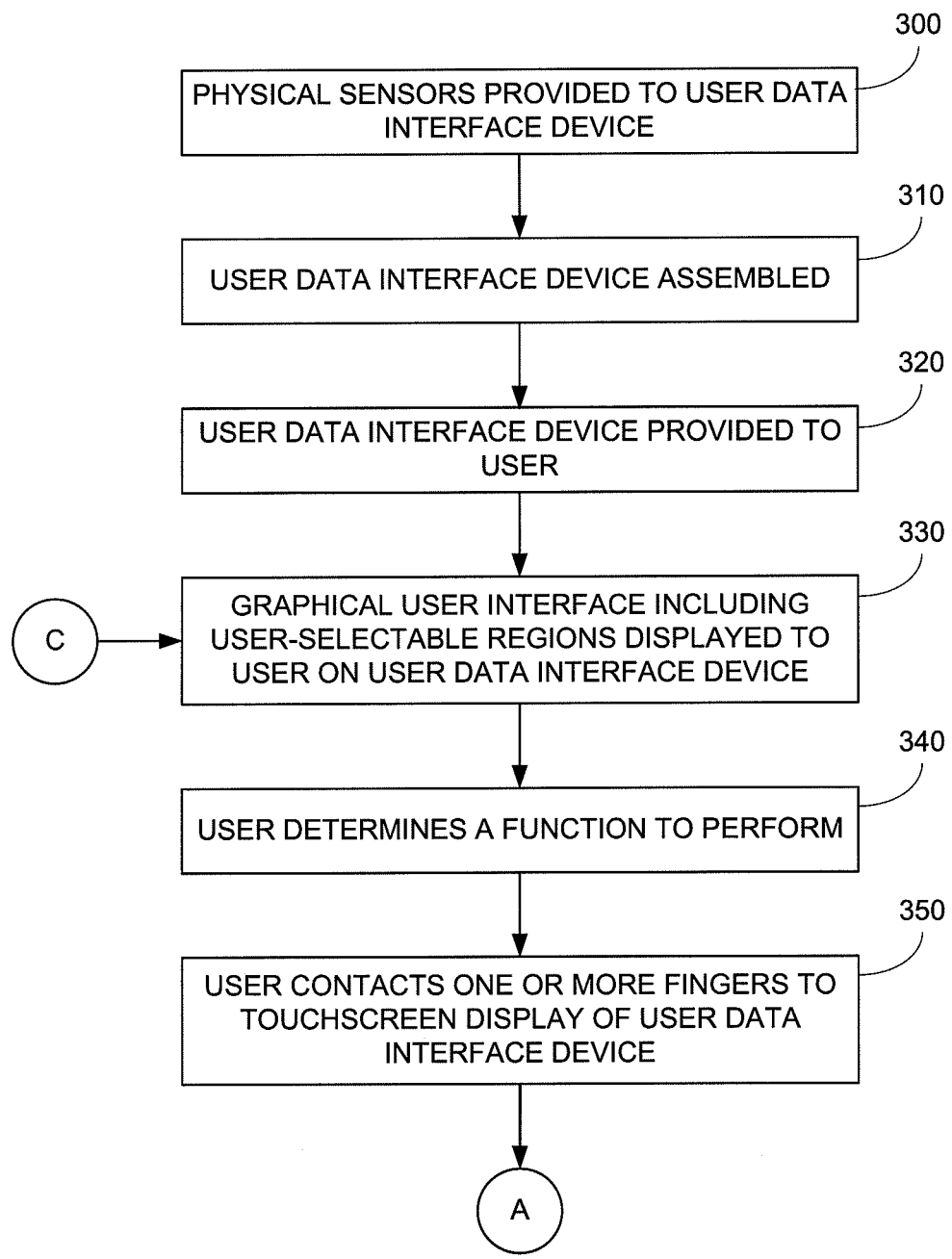
FIGS. 2A-D illustrate block diagrams of flow processes according to various embodiments of the present invention.
Figure 2B:
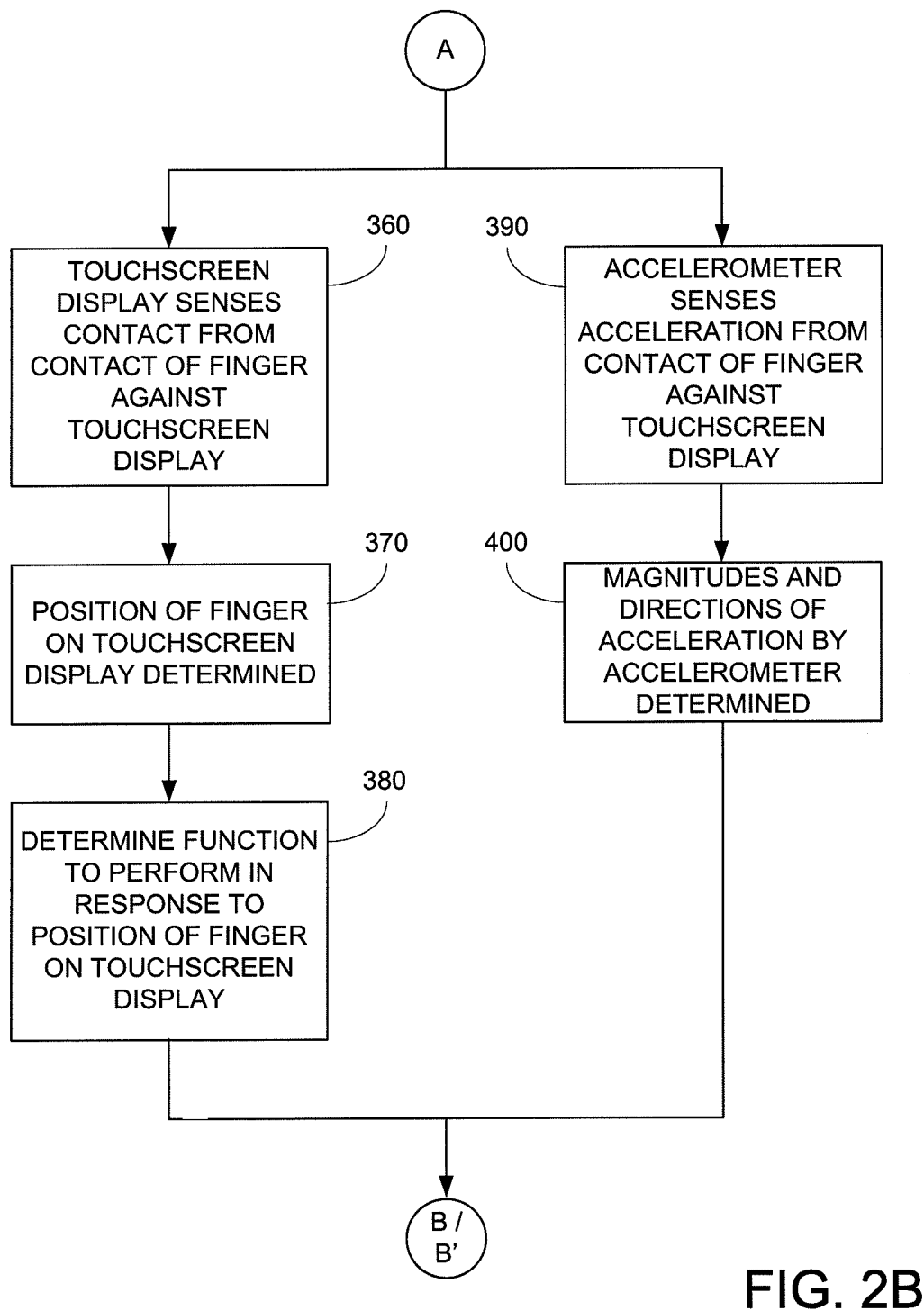

In FIG. 2B, touch screen display 130 senses the user contact in step 360. As described above, in various embodiments, touch screen display 130 may perform this function via the use of resistive sensors, capacitive sensors, or the like. In response to the physical sensor data, the user-selectable region within the GUI is determined, step 370. Next, in various embodiments, computing device 100 then determines one or more functions associated with the user-selectable region, step 380.

In various embodiments of the present invention, it is contemplated that when a user contacts her finger on touch screen display 130 in step 350, computing device 100 (physical sensors 210) will be physically perturbed, step 390. For example, when the user touches touch screen display 130, computing device 100 (physical sensors 210) will be subject to a force (e.g. a change in sensed physical state, a physical perturbation). In various embodiments, this physical change causes physical sensors 210 to sense a change in spatial location (sensed by an accelerometer), causes physical sensors 210 to sense a change its tilt or orientation (sensed by a gyroscope), or the like. For sake of convenience, FIG. 2A merely references use of an accelerometer. In other embodiments, this change causes physical sensors 210 to sense a change in a magnetic field, sense a change in GPS coordinates, sense a change in temperature or air pressure, or the like.

Next, in various embodiments in response to the perturbations of the computing device 100/physical sensors 210, magnitudes and/or directions of the changes are determined in step 400. As described in the above-referenced patent applications, the CMOS foundry-compatible MEMS physical sensor embodiments of the present invention provide a higher level of sensitivity and lower level of noise for such measurements than is currently available.

Figure 2C:
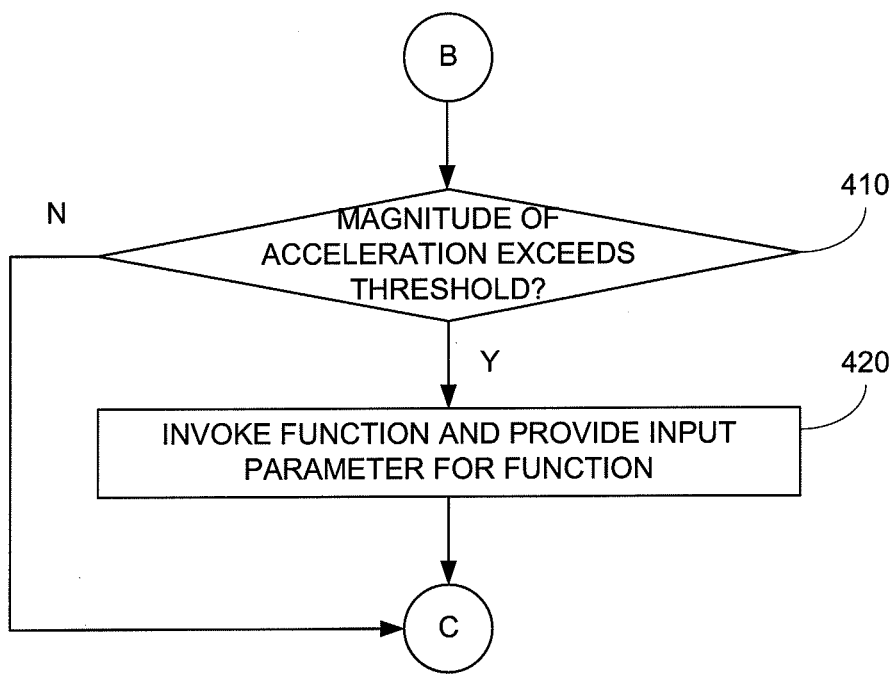
Figure 2D:
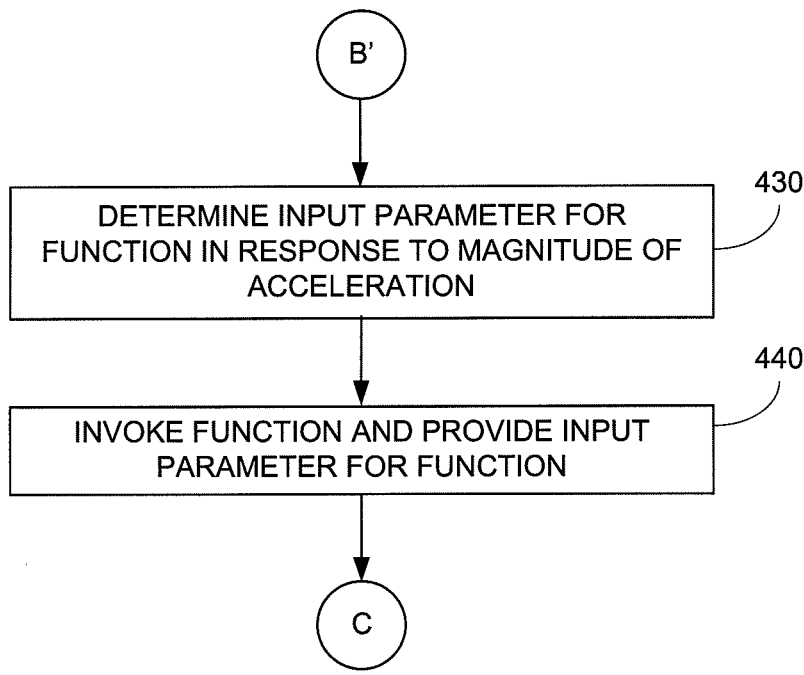

In various embodiments of the present invention, the process may then proceed to FIG. 2C or 2D.

In the example illustrated in FIG. 2C, a determination is then made as to whether the type, magnitude and/or direction of the sensed physical perturbations exceed a predetermined threshold, step 410. In various embodiments, the type of sensed perturbations and the threshold may be predetermined by the operating system, may be set by the user during, for example, a setup phase, may be specified by the application of function or the like.

As various examples, the threshold may be an acceleration in a −z-direction (away from a touch screen display) of 0.1 g, an acceleration in a −z-direction of 0.05 g followed by an acceleration in the +z-direction of 0.03 g; an acceleration of 0.1 g in the −z-direction and accelerations of 0.03 g in the x and y directions; a tilt of 0.5 degrees in a first axis rotation at the same time as a tilt of 1 degree in a second axis of rotation; a tilt of 0.2 degrees in a first axis followed by a tilt of −0.3 degrees in the first axis; a increase in magnetic field by 10 gauss; an increase in atmospheric pressure of 10 mm Hg for 0.25 seconds; and the like. In light of the present patent disclosure, one of ordinary skill in the art will recognize many different thresholds based upon permutations of acceleration, tilts, magnetic fields, pressure, gps coordinates, time, and the like, that are within the scope of embodiments of the present invention.

In various embodiments, if the threshold is exceeded, the function determined in step 380 is performed, step 420; if not, the process returns to step 330. Embodiments may be applied to any number of different functions, for example, a virtual telephone keypad. In typical situations, a user may inadvertently make a telephone call when the cell phone is in his pocket and he reaches for his keys. As his fingers brush against the virtual keypad, the telephone may interpret these as user selections for a telephone number to call. In various embodiments, inadvertent calls may be avoided if it is required that the physical sensors detect an acceleration (e.g. 0.1 g) primarily in the −z direction at about the same time the user touches the virtual keyboard keys. When in his pocket, when the fingers brush or knock against the key pad, the physical sensors may detect an acceleration of 0.05 g in the −z direction, 0.02 in the x direction and 0.05 in the y direction, then, the user touch may be ignored. Accordingly, the execution of unintended user functions on a computing device may be reduced.

In additional embodiments of the present invention, the process of FIG. 2B may proceed to FIG. 2D. In these embodiments a determination is then made as to a value for an input parameter based upon the type, magnitude and/or direction of the sensed physical perturbations, step 430. In various embodiments, a relationship between the type of sensed perturbations and the input parameter may be predetermined by the operating system, may be set by the user during, for example, a setup phase, may be specified by the application of function or the like.

Similar to the embodiment illustrated in FIG. 2C, a number of different thresholds may be used and mapped to different values for the input parameter. In various examples, an acceleration in a −z-direction (away from a touch screen display) of 0.1 g may map to an input value of "1," 0.2 g may map to "2," 0.3 g may map to "3," or the like; an acceleration in only a −z direction of 0.01 g may map to an input value of "256," an acceleration of 0.01 g in the −z direction and 0.05 g in the x-direction may map to an input value of "512;" a clockwise roll of 0.1 degrees may map to an input value of "increase," a counter clock-wise roll of 0.1 degrees may map to an input value of "decrease," or the like.

In response to the value for the input parameter determined, in step 440, the function may be performed using this value. Embodiments may be applied to any number of different functions, for example, a painting program. In such cases, a harder tap may be associated with a larger paint spot upon a canvas, a softer tap may be associated with a smaller spot upon a canvas, and the like. In other embodiments, other types of parameters may also be adjusted based upon sensed physical change such as: position of graphic elements, brightness, contrast, gamma, sharpness, saturation, filter, and the like. As another example, a flick of a finger at a first velocity with a low impact may be associated moving a series of images at a slower rate, a flick of a finger at the first velocity with a higher impact may be associated moving a series of images at a faster rate. In other embodiments, other types of parameters may also be adjusted, such as: rate of acceleration, rate of rotation, rate of zoom, rate of pan, and the like. As another example, the type or magnitude of sensed physical change may control a volume level, a microphone sensitivity level, a bass level, a treble level, or the like. Accordingly, the execution of user functions may have different input parameters of values based upon sensed physical changes.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

Figure 3:
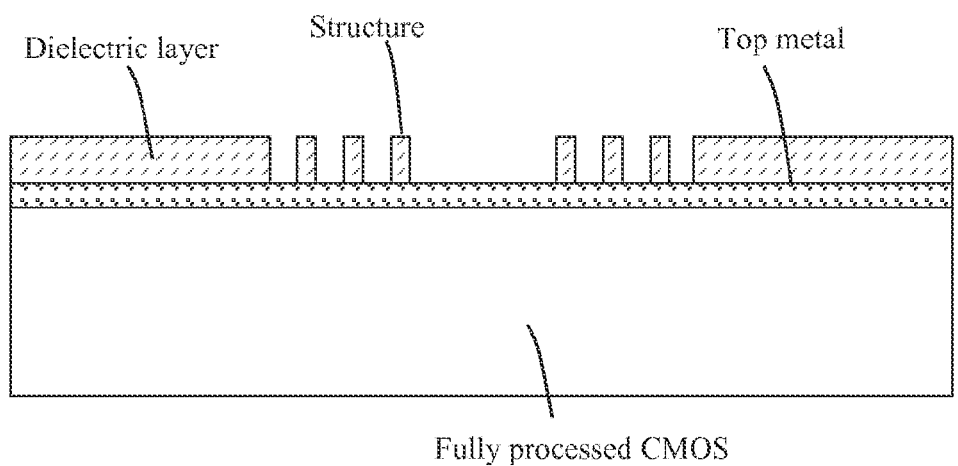
FIG. 3 is a simplified cross section diagram of components of a starting CMOS substrate according to one embodiment of the present invention.

FIG. 3 is a simplified cross section diagram of components of a starting CMOS substrate according to one embodiment of the present invention. As depicted, the starting substrate is a fully processed CMOS wafer. A dielectric layer such as oxide and nitride is deposited on top of a top metal layer of the CMOS wafer. The dielectric layer is then patterned to form a structure that provides anchor points for stationary members of the mechanical sensing device.

Figure 4:
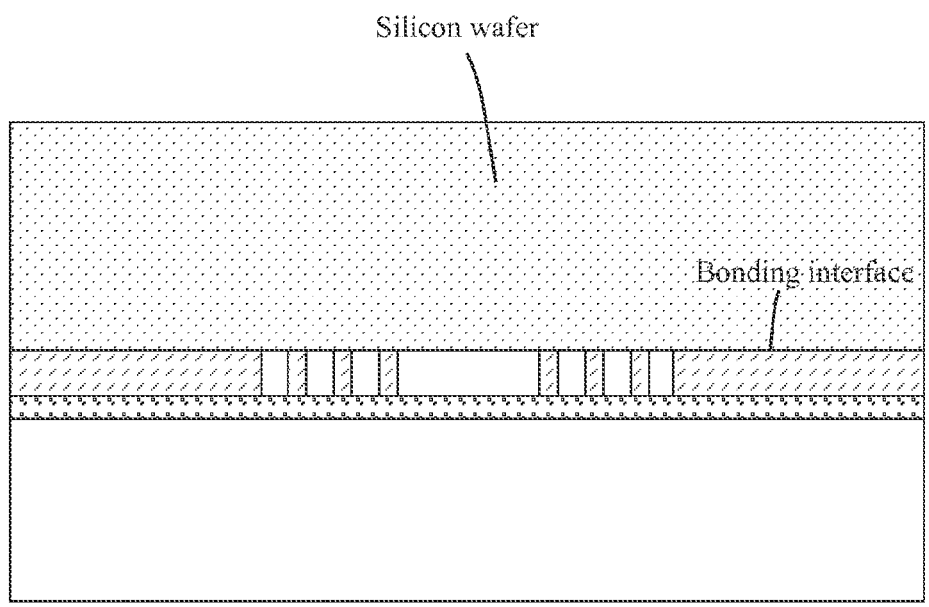
FIG. 4 is a simplified cross section diagram of components of a monolithically integrated inertial sensing device according to one embodiment of the present invention.

FIG. 4 is a simplified cross section diagram of components of a monolithically integrated inertial sensing device according to one embodiment of the present invention. As depicted, a silicon wafer is bonded to the CMOS substrate. The bonding methods include but not limited to: covalent, Sprin-on-glass (SOG), Eutectic, and anodic. The bonding temperature is CMOS compatible and below 400 C.

Figure 5:
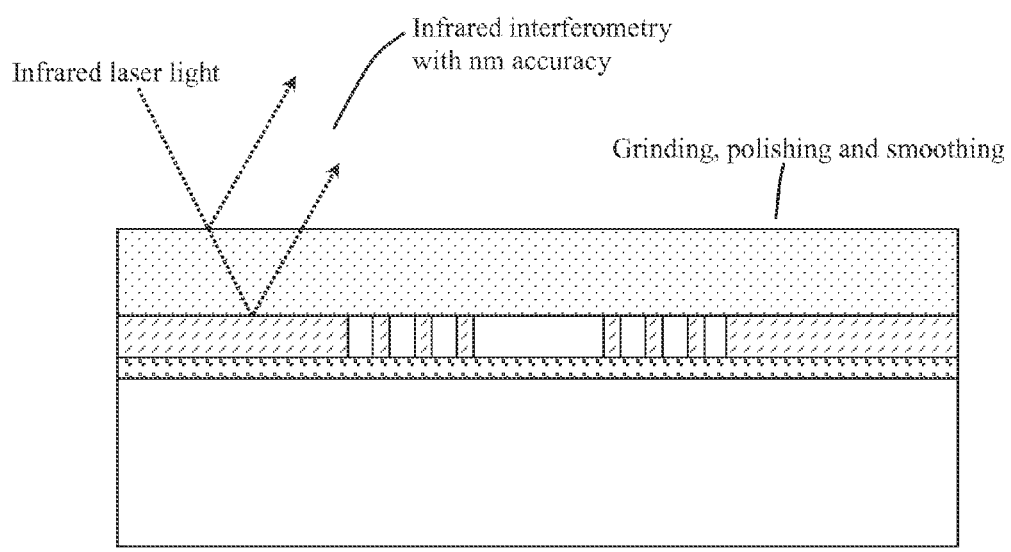
FIG. 5 is a simplified cross section diagram of components of a monolithically integrated inertial sensing device according to one embodiment of the present invention.

FIG. 5 is a simplified cross section diagram of components of a monolithically integrated inertial sensing device according to one embodiment of the present invention. As depicted, the silicon substrate is thinned by techniques such as grinding, polishing, and etching. The final thickness of the remaining silicon atop of the CMOS is precisely measured by infrared interferometry method with nano meter accuracy. Infrared wavelength is used because silicon is transparent in this spectrum.

Figure 6:
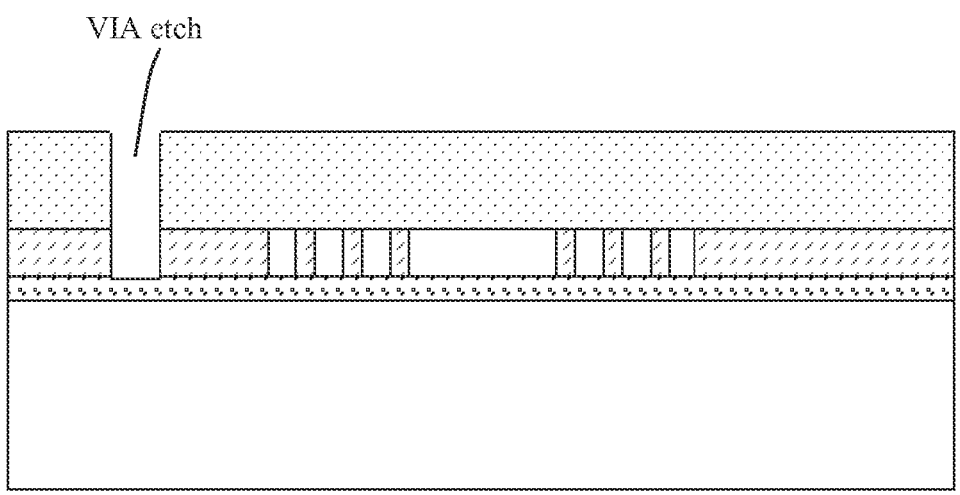
FIG. 6 is a simplified cross section diagram of components of a monolithically integrated inertial sensing device according to one embodiment of the present invention.

FIG. 6 is a simplified cross section diagram of components of a monolithically integrated inertial sensing device according to one embodiment of the present invention. As depicted, a VIA hole is etched into the silicon and top dielectric layers and stop on the top metal layer. The size of the VIA ranges from 0.5 um to a few micro meters depending on the thickness of the silicon layer. The profile or sidewall of the VIA is tapered or slopped for better step coverage of subsequent metalization step.

Figure 7:
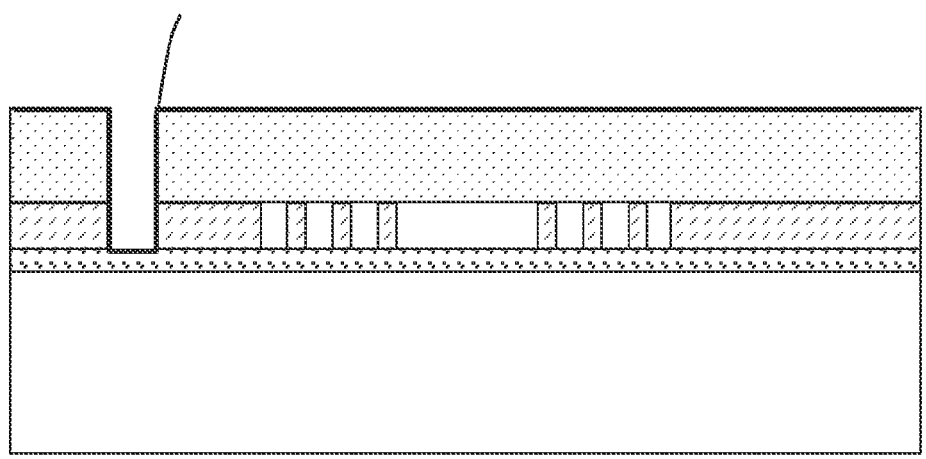
FIG. 7 is a simplified cross section diagram of components of a monolithically integrated inertial sensing device according to one embodiment of the present invention.

FIG. 7 is a simplified cross section diagram of components of a monolithically integrated inertial sensing device according to one embodiment of the present invention. As depicted, a metal layer is blanket deposited on the wafer covering the silicon surface as well as the VIA surface. CVD or PVD recipes are optimized to achieve good step coverage of the VIA as well as low stress of the metal film. In one embodiment, the metal layer is a CVD TiN material that has excellent step coverage of the VIA. The thickness of the metal ranges from a few hundreds of angstroms to a few micro meters depending the applications requirements. An optional electroplating step can be used to fill the entire VIA with metals such as Copper or Nickel.

Figure 8:
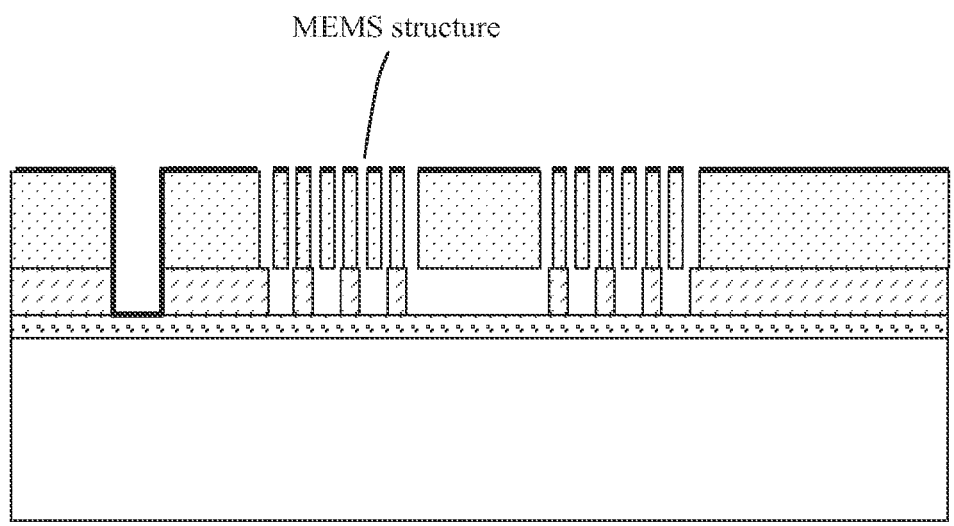
FIG. 8 is a simplified cross section diagram of components of a monolithically integrated inertial sensing device according to one embodiment of the present invention.

FIG. 8 is a simplified cross section diagram of components of a monolithically integrated inertial sensing device according to one embodiment of the present invention. As depicted, the silicon layer is patterned typically by a DRIE step. For a capacitive inertial sensor, the mechanical structure includes a proof mass connected with springs, movable comb fingers and stationary comb fingers that anchored to the top oxide. The springs have desired stiffness/compliance that allows the proof mass to move at certain external acceleration. The comb fingers moving along with the proof mass couples to stationary comb fingers capacitively. The movement causes a change in capacitance between the movable comb fingers and stationary comb fingers. The capacitance change is detected by the integrated circuits a few micrometer below.

Figure 9:
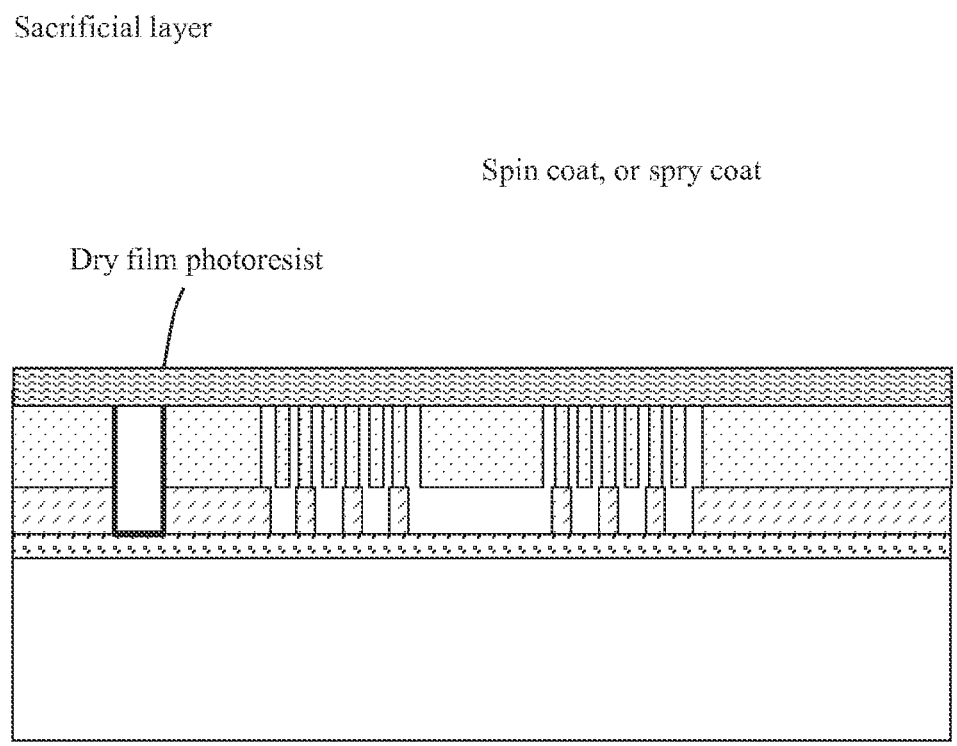
FIG. 9 is a simplified cross section diagram of components of a monolithically integrated inertial sensing device according to one embodiment of the present invention.

FIG. 9 is a simplified cross section diagram of components of a monolithically integrated inertial sensing device according to one embodiment of the present invention. As depicted, an organic sacrificial material is deposited covering the mechanical structure. In one embodiment, the sacrificial material is a liquid photo resist that is spin coated on the wafer and fill all the VIA holes and trenches. In another embodiment, the sacrificial material is a dry film photoresist that is deposited on the surface of the wafer and does not fill the holes and trenches.

Figure 10:
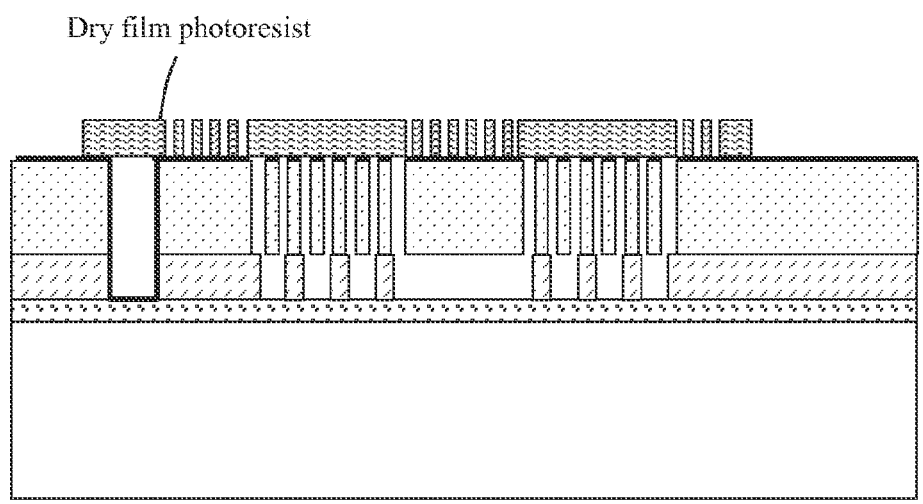
FIG. 10 is a simplified cross section diagram of components of a monolithically integrated inertial sensing device according to one embodiment of the present invention.

FIG. 10 is a simplified cross section diagram of components of a monolithically integrated inertial sensing device according to one embodiment of the present invention. As depicted, the photo resist is patterned by an exposure and develop lithography process. The exposed areas are non-trench features such as proof mass and anchors.

Figure 11:
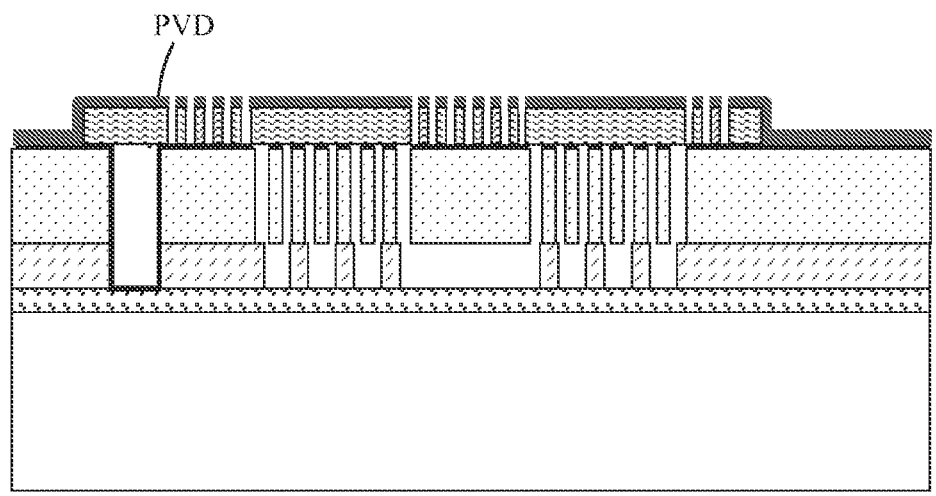
FIG. 11 is a simplified cross section diagram of components of a monolithically integrated inertial sensing device according to one embodiment of the present invention.

FIG. 11 is a simplified cross section diagram of components of a monolithically integrated inertial sensing device according to one embodiment of the present invention. As depicted, the $1^{st}$ layer of the encapsulation is deposited by a PVD process. The deposition recipe is optimized for non-conforming purpose, which has little step coverage of the sidewall of the exposed photoresist trenches.

Figure 12:
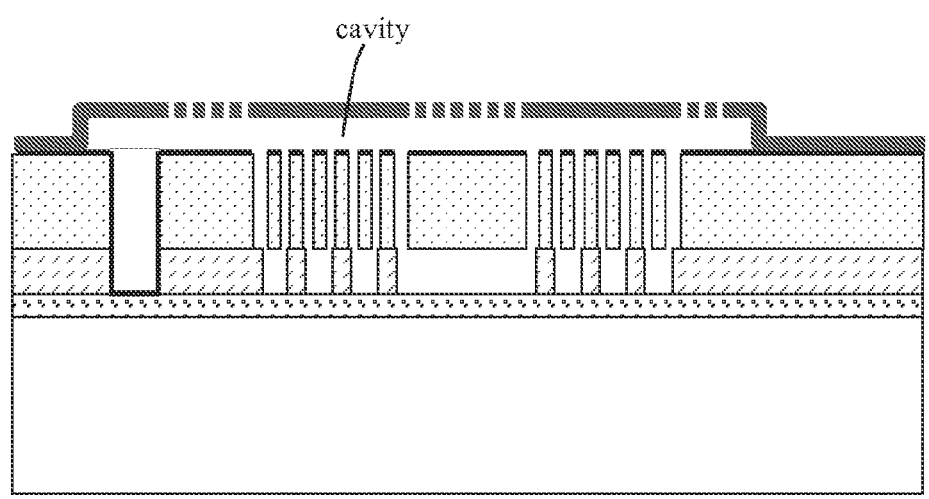
FIG. 12 is a simplified cross section diagram of components of a monolithically integrated inertial sensing device according to one embodiment of the present invention.

FIG. 12 is a simplified cross section diagram of components of a monolithically integrated inertial sensing device according to one embodiment of the present invention. As depicted, the sacrificial organic material is then removed by a dry 02 plasma ashing step. The removal of the sacrificial material releases the sensor device and forms the $1^{st}$ shell of the encapsulation.

Figure 13:
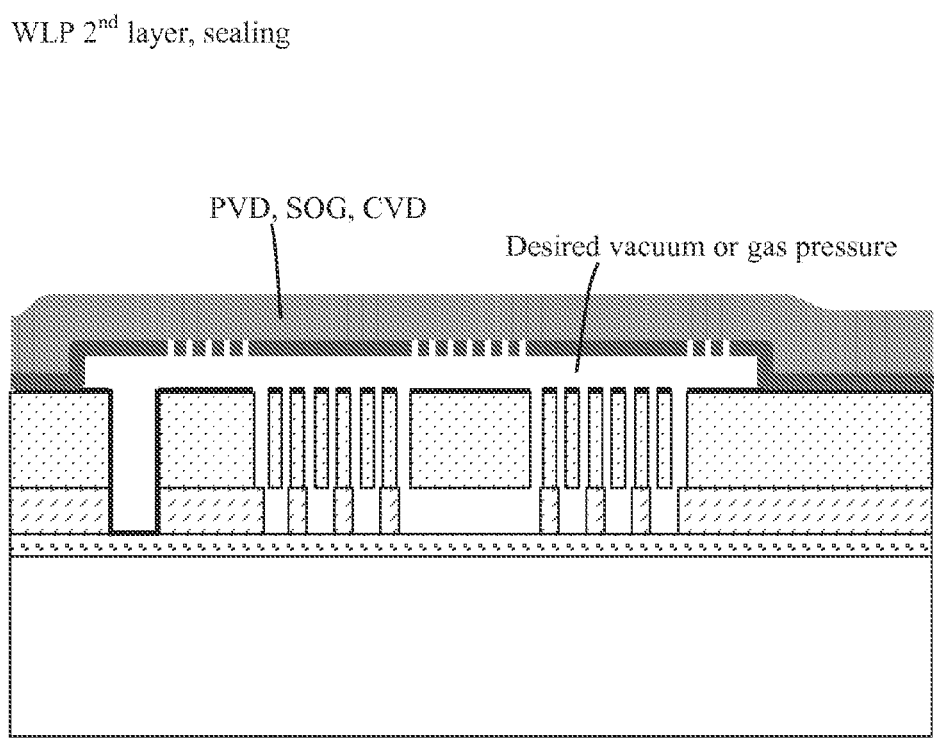
FIG. 13 is a simplified cross section diagram of components of a monolithically integrated inertial sensing device according to one embodiment of the present invention.

FIG. 13 is a simplified cross section diagram of components of a monolithically integrated inertial sensing device according to one embodiment of the present invention. As depicted, the $2^{nd}$ layer of the encapsulation is deposited onto the $1^{st}$ layer. The sealing methods include PVD, spin-on, or spray-on techniques. The sealing materials include metal such as Ti, TiN, amorphous silicon, spin-on-glass, spray-on-glass, or a combination of the above. The ambient during sealing is optimized and controlled to a desired spec that defines the sensor device ambient after sealing. A getter material such as Ti can be deposited as the $1^{st}$ layer of the encapsulation and activated later to achieve high vacuum and cleanness of the sensor ambient environment. After sealing the holes, an optional CVD dielectric material such as oxide or nitride can be added onto the encapsulation.

Figure 14:
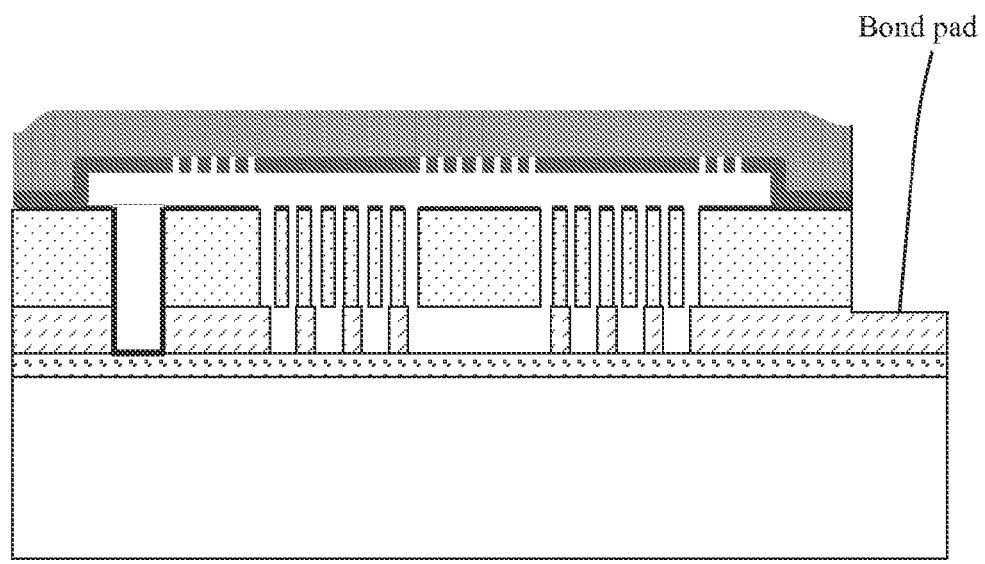
FIG. 14 is a simplified cross section diagram of components of a monolithically integrated inertial sensing device according to one embodiment of the present invention.

FIG. 14 is a simplified cross section diagram of components of a monolithically integrated inertial sensing device according to one embodiment of the present invention. As shown, a bond pad structure is formed. The bond pad structure can be formed by pattern and etch techniques known in the art, but can also be others depending on the application.

Comparing to the incumbent bulk or surface micromachined MEMS inertial sensors, the vertically monolithically integrated inertial sensors have smaller chip size, lower parasitics, higher sensitivity, lower power, and lower cost. Using this architecture and fabrication flow, it is also feasible and cost-effective to make an array of inertial sensors for sensing multiple axes of accelerations on a single chip.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for performing a user-defined function in a computer system, performed by the computer system that is programmed to perform the method comprising:

determining by a display of the computer system, an indication of a display position associated with the display in response to a user-initiated change in state of a user-controlled user input device relative to the computer system, wherein the user-initiated change in state is also associated with a rate of change in the state;

determining by a physical sensor of the computer system, a magnitude of change in sensed physical properties by the physical sensor in response to the rate of change in the state;

determining by the computer system whether the magnitude of change in sensed physical properties by the physical sensor exceeds a threshold level;

determining by the computer system, a user selection of a function to perform in response to the indication of the position associated with the display when the magnitude of change in sensed physical properties by the physical sensor exceeds the threshold level;

initiating by the computer system, performance of the function in response to the user selection of the function to perform; and inhibiting by the computer system, performance of the function when the magnitude change in sensed physical properties by the physical sensor does not exceed the threshold level; and wherein the physical sensor comprises a monolithic MEMS and CMOS integrated circuit device, wherein the monolithic MEMS and integrated circuit device comprises:

a first semiconductor substrate having a first surface region;

one or more CMOS integrated circuit devices provided on a CMOS integrated circuit device region overlying the first surface region, the CMOs integrated circuit device region having a CMOS surface region;

a dielectric region overlying the CMOS surface region, the dielectric region having a cavity region provided therein;

a second semiconductor substrate having a second surface region overlying the dielectric region and enclosing the cavity region, the second semiconductor substrate having a spring region overlying a vicinity of the cavity region;

a first piezo resistor device provided within a first portion of the spring region of the second semiconductor substrate;

a second piezo resistor device provided within a second portion of the spring region of the second semiconductor substrate; and a mass of material coupled to a portion of the spring region of the second semiconductor substrate between the second piezo resistor device and the first piezo resistor device, the mass material being overlying the cavity region and coupled to the spring region to be movable from at least a first position to a second position and to be sensed respectively by either or both the first piezo resistor device and the second piezo resistor device.

2. The computer implemented method of claim 1 wherein the user-controlled user input device is selected from a group consisting of: a finger of the user, a stylus, a capacitive-based stylus, a portion of body, an object.

3. The computer implemented method of claim 1 wherein the function is selected from a group consisting of: initiating a program, selecting a button, selecting an icon, selecting a keyboard key, selecting a menu command, performing a telephone switching function, selecting a link.

4. The computer implemented method of claim 1 wherein the display of the computer system is selected from a group consisting of: a capacitive display, a resistive display.

5. A computer device comprising:
a display configured to display images to a user and configured to sense a user touch on the display with a user-controlled device;
a display controller coupled to the display, wherein the display controller is configured to determine a selected location on the display in response to the user touch;
a physical sensor, wherein the physical sensor is configured to sense physical forces acting upon the physical sensor and configured to determine magnitudes of change in physical forces acting upon the physical sensor in response to the user touch;
a processor coupled to the display controller and to the physical sensor, wherein the processor is programmed to determine a user-selected function to perform in response to the selected location on the display, wherein the processor is programmed to initiate execution of the user-selected function when the magnitudes of changes in sensed physical properties by the physical sensor exceeds the threshold level, and wherein the computer system is programmed to ignore the selected location when the magnitudes of changes in sensed physical properties by the physical sensor does not exceed the threshold level;
wherein the physical sensor comprises a monolithic MEMS and CMOS integrated circuit device, wherein the monolithic MEMS and integrated circuit device comprises:
a first semiconductor substrate having a first surface region;
one or more CMOS integrated circuit devices provided on a CMOS integrated circuit device region overlying the first surface region, the CMOs integrated circuit device region having a CMOS surface region;
a dielectric region overlying the CMOS surface region, the dielectric region having a cavity region provided therein;
a second semiconductor substrate having a second surface region overlying the dielectric region and enclosing the cavity region, the second semiconductor substrate having a spring region overlying a vicinity of the cavity region;
a first piezo resistor device provided within a first portion of the spring region of the second semiconductor substrate;
a second piezo resistor device provided within a second portion of the spring region of the second semiconductor substrate; and
a mass of material coupled to a portion of the spring region of the second semiconductor substrate between the second piezo resistor device and the first piezo resistor device, the mass material being overlying the cavity region and coupled to the spring region to be movable from at least a first position to a second position and to be sensed respectively by either or both the first piezo resistor device and the second piezo resistor device.

6. The computer device of claim 5 wherein the user-controlled device is selected from a group consisting of: a finger of the user, a stylus, a capacitive-based stylus, a portion of a body, an object.

7. The computing device of claim 5 wherein the function is selected from a group consisting of: initiating a program, selecting a button, selecting an icon, selecting a keyboard key, selecting a menu command, performing a telephone switching function, selecting a link.

8. The computer device of claim 5 wherein the display of the computer system is selected from a group consisting of: a capacitive display, a resistive display.

9. The computing device of claim 5 wherein the processor is programmed to receive the selected location on the display and the magnitudes of change in a manner selected from a group consisting of: substantially simultaneously, serially.

10. The computing device of claim 5 wherein the physical sensor comprises at least a six-axis MEMS device.

11. The computing device of claim 5 wherein the physical sensor comprises at least a ten-axis MEMS device.

* * * * *